March 28, 1939.　　W. R. TALIAFERRO ET AL　　2,151,812
AUTOMATIC RECLOSING SYSTEM FOR CIRCUIT BREAKERS
Filed Jan. 16, 1937　　2 Sheets-Sheet 1
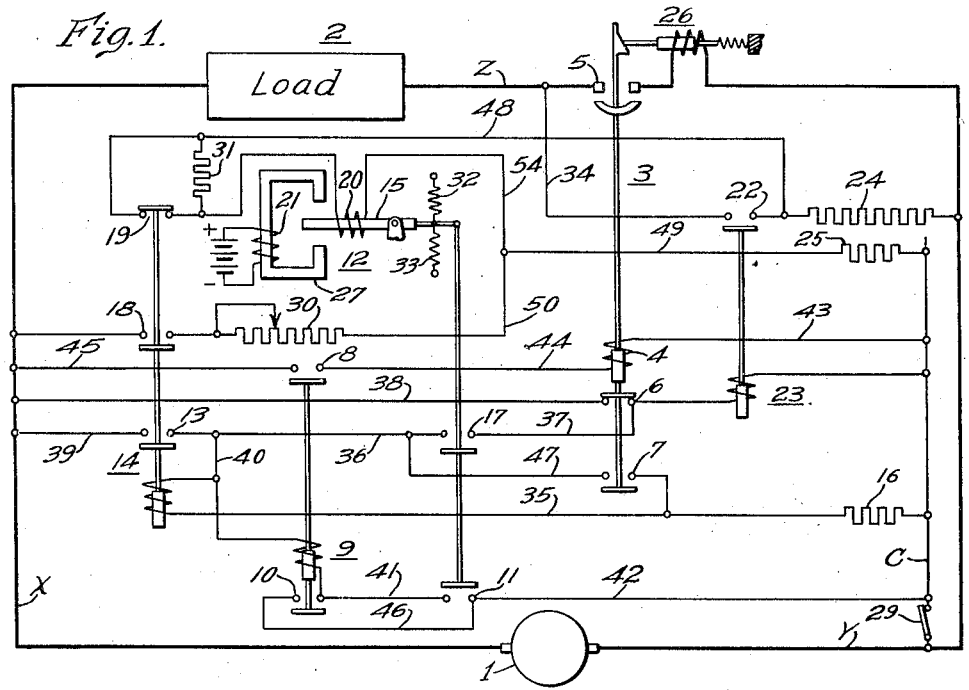
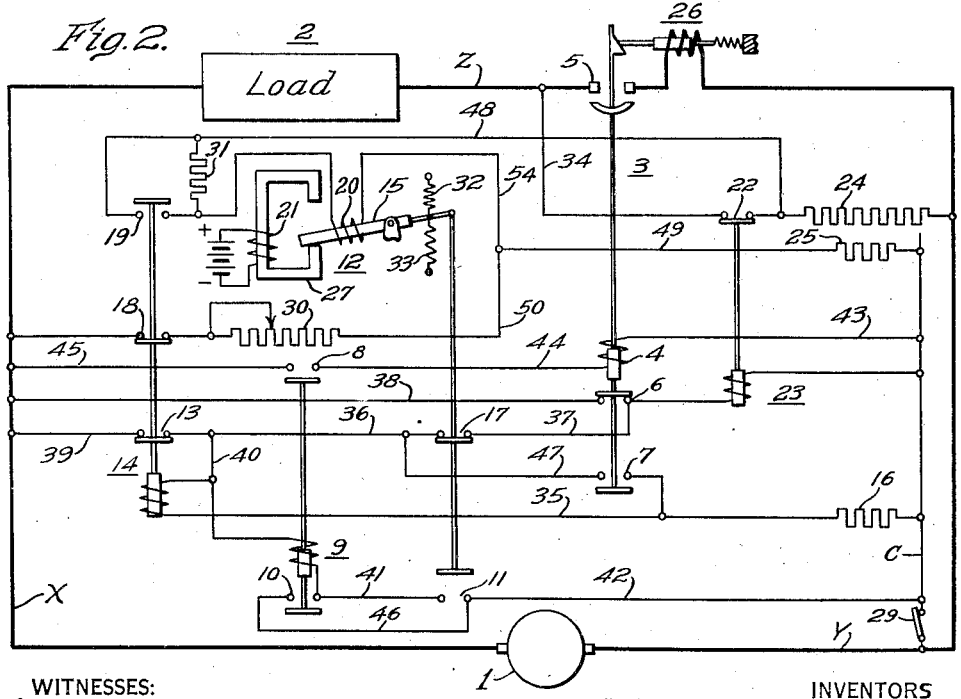
WITNESSES:
INVENTORS
William R. Taliaferro and
Robert R. Longwell.
BY
ATTORNEY March 28, 1939.　　W. R. TALIAFERRO ET AL　　2,151,812
AUTOMATIC RECLOSING SYSTEM FOR CIRCUIT BREAKERS
Filed Jan. 16, 1937　　2 Sheets-Sheet 2
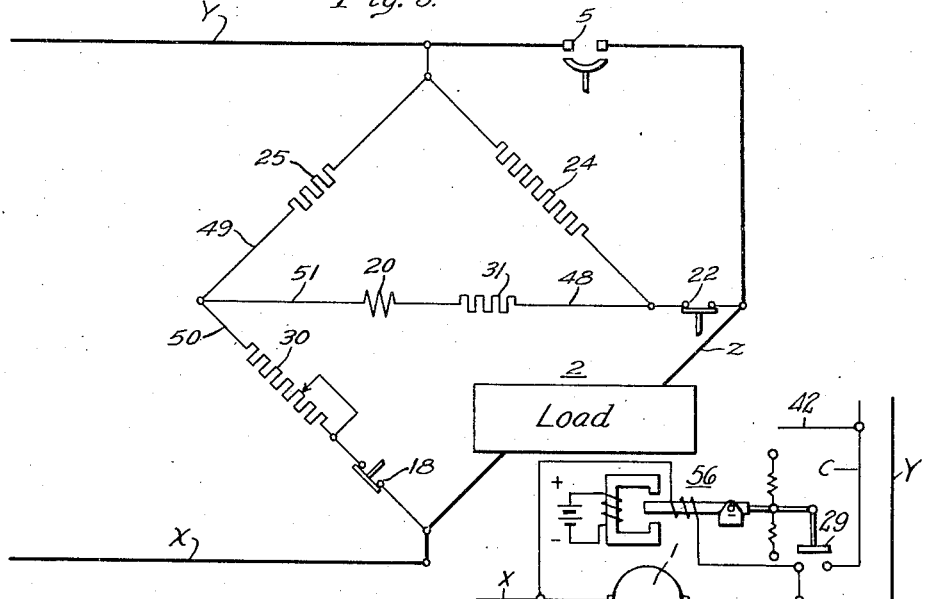
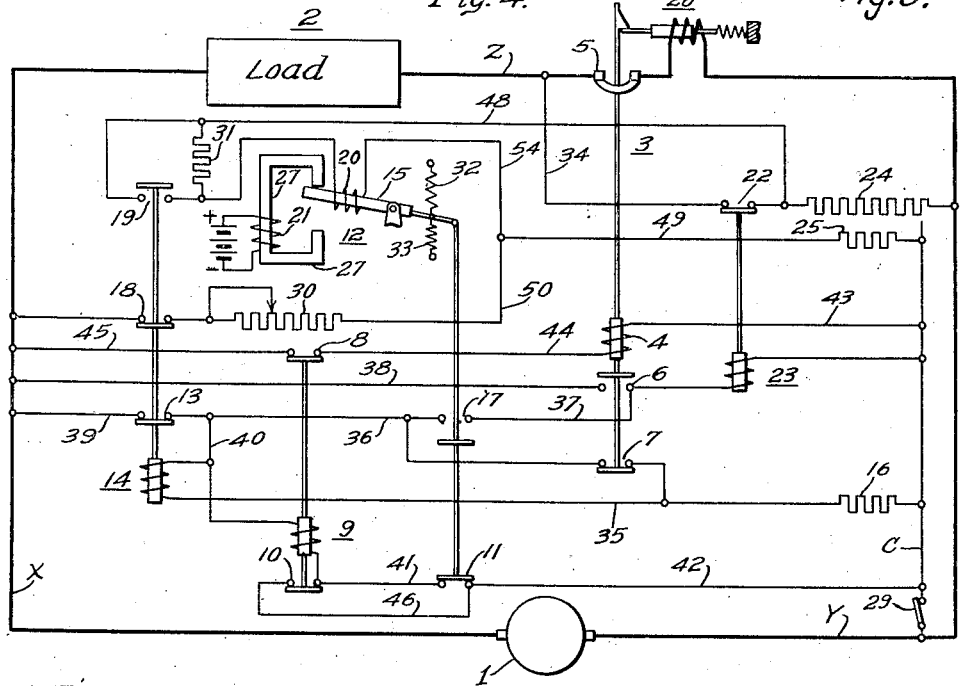
WITNESSES:
C. J. Weller.
Joe Weber.
INVENTORS
William R. Taliaferro and
Robert R. Longwell.
BY G. M. Crawford
ATTORNEY Patented Mar. 28, 1939

2,151,812

UNITED STATES PATENT OFFICE 2,151,812

AUTOMATIC RECLOSING SYSTEM FOR CIRCUIT BREAKERS

William R. Taliaferro, Pittsburgh, and Robert R. Longwell, Forest Hills, Pa., assignors to Westinghouse Electric & Manufacturing Company, East Pittsburgh, Pa., a corporation of Pennsylvania Application January 16, 1937, Serial No. 120,938

5 Claims. (Cl. 175—294)

Our invention relates, generally, to automatic reclosing circuit breaker systems, and more particularly, to a relay system which will function to close a circuit breaker to a direct-current machine, such as a generator or converter, only after the voltage of the machine has reached a predetermined value and is of the same polarity as the line to which it is to be connected and the load to which the machine is to be connected has been reduced to a predetermined value.

In the operation of feeder systems for power service to electric railways, mining machinery and such loads, several direct-current generators or rotary converters are usually employed to supply the necessary power, and these generators are located in sub-stations which are more or less widely distributed over the feeder system. When the load demands of the system become great enough to make it necessary that an additional generator be put into service, or when it is necessary to reconnect a generator to a feeder after it has become automatically disconnected because of overload, or for any other reason, it is necessary that the generator voltage be of the same polarity as the voltage being maintained on the feeder by other generators, that the generator voltage be at least equal to, and preferably slightly greater than, the feeder voltage, and that the load to which the generator is to be connected be not more than could be safely carried by the generator.

It has been the practice, particularly in automatic sub-stations where no attendant is present to test for polarity, voltage and load, to provide a relay system for automatically closing or reclosing the circuit breaker between a generator or rotary converter and the feeder, the relay system being governed by a voltage directional relay which is responsive to a predetermined polarity and voltage value and a load measuring directional relay which is so connected as to operate only when the load to which the generator is to be connected is below a predetermined amount.

The polarity and voltage relay in such systems is so connected as to condition the circuit breaker for closure only when the polarity of the generator corresponds to that of the feeder system, and when the voltage of the generator is at least equal to, and preferably slightly greater than, the feeder voltage.

The second directional relay is connected in circuit with a modified Wheatstone bridge arrangement in which the load circuit is connected and functions to effect closure of the circuit breaker only in the event that the load, as determined by its equivalent resistance measured in the Wheatstone bridge circuit, is below a predetermined value based on the load capacity of the generator or the load which it is desired to have the generator carry.

It will be readily seen that two directional relays and auxiliary circuits therefor are necessary in the system previously used for closing a circuit breaker only after the polarity and voltage of a generator correspond to that of the feeder to which the circuit breaker connects the generator, and the load on the feeder which will have to be handled by the generator is below a predetermined amount.

The object of our invention is to provide a relay system which will perform the function of checking the generator polarity and voltage and feeder load before closing a circuit breaker between a direct-current generator, rotary converter, or other direct current source, and a feeder system, and which will require the use of but one directional relay instead of the usual two directional relays, as pointed out hereinbefore.

Another object of our invention is to provide a simplified relay system which will perform the function of checking the generator polarity and voltage and the feeder load before closing a circuit breaker between a direct-current generator, rotary converter, or other direct current source, and a feeder system, and which will require fewer control relays and auxiliary apparatus than are ordinarily used for the purpose, resulting in less complexity, a saving of space required for the apparatus, and a saving in cost of the apparatus and the cost of its operation, maintenance and repair.

A further object of our invention is to provide a simplified automatic circuit breaker control system in which a single relay shall perform the functions which have heretofore required the use of two such relays.

In practicing our invention in its preferred form, we provide a directional relay which will actuate either of two circuits depending upon the polarity and magnitude of the voltage applied to it. This relay is so associated with auxiliary relays and circuits, including one of the circuits controlled by it, as to condition for operation a closing circuit for a circuit breaker when a generator which it is desired to connect to a feeder by means of the circuit breaker, is of the same polarity as the feeder and has a potential which is slightly higher than the potential of the feeder. The directional relay is also so associated with a Wheatstone bridge circuit, which is arranged to measure the effective resistance of the load circuit to which the generator is to be connected, and other relays and circuits, including the other circuit controlled by it, as to cause the energization of the circuit breaker closing circuit when the equivalent resistance of the load which the generator will have to pick up when connected to the feeder, as measured by the Wheatstone bridge arrangement, is above a value corresponding to the value of the load rating of the generator or the load which it is desired to have the generator carry. Thus, the single directional relay performs the triple function of checking the polarity, the voltage and the load before connecting the generator to the load.

These and other objects that will be made apparent throughout the further description of our invention, are attained by means of the apparatus hereinafter described and illustrated diagrammatically in the accompanying drawings, in which:

Figure 1 is a diagrammatic view of a system embodying the principal features of our invention, the various parts being shown in their cooperative relation and normal position when the generator is at rest or when the generator is running but no steps have been taken to connect it to the load;

Fig. 2 is a diagrammatic view of the system of Fig. 1 showing the position of the various parts after the generator has been brought up to speed, the voltage and polarity have been checked by the directional relay, and the directional relay has been connected in the bridge circuit to test the equivalent resistance of the load circuit;

Fig. 3 is a simplified diagram of the essential parts of the apparatus which comprise the bridge arrangement for testing the equivalent resistance of the load;

Fig. 4 is a diagrammatic view of the system of Fig. 1 showing the various parts in the positions which they assume just as the directional relay has responded to an equivalent load resistance of a predetermined value and has caused the circuit breaker to connect the generator to the feeder; and Fig. 5 is a diagram of a modification of a part of the system shown in Figs. 1, 2 and 4.

Referring to Figure 1, a direct-current generator, converter or any similar source of direct-current power, generally designated by reference character 1, is shown in position in circuit to be connected to the load 2 by circuit breaker 3, which when closed, will complete the connection between conductor Y and the direct-current feeder Z. The other generator conductor X is shown as permanently connected to the load.

The closing coil 4 of the circuit breaker is connected in a circuit which is controlled by the contact members 8 of relay 9. Relay 9 is controlled by contact members 11 of a directional relay 12, and contact members 13 of relay 14. Contact members 13 of relay 14 also complete a holding circuit for relay 14 through a circuit which includes resistance 16.

The energization of relay 14 is accomplished by closure of contact members 17 of relay 12 when circuit breaker 3 is in the open position and, therefore, holds its contact members 6 closed.

It will be noted that when relay 14 is energized it closes its contact members 18 to complete a circuit to adjustable resistance 30 and opens contact members 19 to remove a shunt circuit from the resistance 31 and thus place resistance 31 in series with coil 20 of relay 12. Resistance 31 is provided to vary the sensitivity of relay 12 in the two different circuits in which it is used.

The directional relay 12 is provided with a stationary winding 21 which is connected to a source of fixed polarity as indicated by the plus and minus signs on the drawings. The coil 21 is positioned to influence a moving coil 20 on an armature 15 through core 27. Armature 15 is normally biased to a neutral position by springs 32 and 33, which yield to allow the relay to close either of its contact members 11 or 17, depending upon the polarity and amount of the potential applied to moving coil 20.

Resistance 24 serves as a shunt circuit connected across the contact members of circuit breaker 3 when relay 23 is energized to supply potential to the coil 20 of relay 12. Resistance 24 also constitutes one leg of a Wheatstone bridge circuit, the elements and functioning of which will be described more in detail hereinafter.

A resistance 25 is provided as a current limiting resistance for the coil 20 of relay 12 in one stage of the operation of the system, and serves as one leg of the aforementioned Wheatstone bridge arrangement in another stage of the operation of the system.

The circuit breaker 3 is held in its closed position by the electro-magnetic trip device 26, which may be actuated to open the circuit breaker in the event of a short circuit or predetermined overload on the feeder Z.

The relay system is energized after the generator 1 has been brought up to speed by the closure of switch 29, which may be either a hand-operated switch, or an electro-magnetically operated circuit breaker, such as is used in automatic substations.

In the operation of our relay system, when it is desired to connect generator 1 to the load circuit, the generator is brought up to speed and switch 29 is closed to energize conductors X—C and this results in the energization of relay 23 and coil 20 of relay 12. Relay 23 will close its contact members 22 to complete a circuit which includes conductor 34, contact members 22 and resistance 24 across the contact members of circuit breaker 3.

If the voltage of generator 1 is of such polarity that it might be properly connected to the feeder Z, and in addition, when the value of the generator voltage is such as to cause current to flow from conductor Y to feeder Z, if circuit breaker 3 were closed, then there will be a current flow through resistance 24 from conductor Y to conductor Z. Since relay coil 20 is connected in shunt with resistance 24, it will be influenced by the voltage drop across resistance 24 caused by the current flow in the resistance. The windings 20 and 21 of directional relay 12 are such as to cause relay 12 to close its contact members 17 when influenced by the voltage drop across resistance 24 of the proper polarity and of a predetermined amount. The closure contact members 17 will cause the energization of the coil of relay 14 through a circuit which includes conductor C from the power source resistance 16, conductor 35, the coil of relay 14, conductor 40, conductor 36, contact members 17, conductor 37, contact members 6, conductor 38 and conductor X to the other side of the power source.

The operation of relay 14 will prepare control relay 9 for operation by closing contact members 13 which are in series with the coil of relay 9. It will be seen that a holding circuit for relay 14 is also completed by the closure of its contact members 13, which holding circuit comprises conductor X from the power source conductor 39, contact members 13, conductor 40, the coil of relay 14, conductor 35, resistance 16 and conductor C to the power source.

At this stage of the operation the elements of the system are in the positions shown in Fig. 2. It will be seen that the operation of relay 14 has caused contact members 18 to complete a bridge circuit. This bridge arrangement is best understood by reference to Fig. 3, in which the various elements which make up the bridge arrangement are shown in their operative relationships. Reference characters 5, 48, 49, 50 and 54 have been placed on the various figures of the drawings to facilitate tracing this bridge circuit on Figs. 1, 2 and 4. It will be seen that one leg of this bridge is resistance 25, another is resistance 24, a third leg is resistance 30, which was connected in circuit by the closure of relay contact members 18, and the fourth leg is the load circuit 2 which is governed in the bridge arrangement by contact members 22 which are held closed by relay 23 while the circuit breaker is open and there is potential on the generator.

The directional relay coil 20 is connected across the bridge arrangement to be influenced by any unbalance in this bridge arrangement and the relation between coils 20 and 21 of relay 12 is such as to cause relay 12 to close contact members 11 if the effective resistance of the load circuit is above a predetermined amount, which amount is governed either by the load capacity of the generator 1 or the load which it is desired that the generator should carry when connected to the feeder.

The resistance element 30 is made variable so that the bridge circuit may be adjusted to render relay 12 responsive to different values of effective load resistance.

It will be seen that the effect of the load circuit on the bridge circuit will be the same whether the load circuit merely includes power consuming apparatus of a certain capacity, or includes power consuming apparatus of a much greater capacity and power supplying apparatus such as generators and rotary converters. The term "effective load resistance" is employed in this description to designate either of these conditions of load circuit.

When the directional relay 12 responds to the predetermined effective load resistance, contact members 11 will be closed causing energization of relay 9 through the circuit which includes conductor C from the power source conductor 42, contact members 11, conductor 41, the winding of relay 9, conductor 40, contact members 13, conductor 39 and conductor X to the power source.

The energization of relay 9 will cause the closure of circuit breaker 3 by energizing the closing coil 4 of the circuit breaker through a circuit which includes conductor C from the power source conductor 43, coil 4, conductor 44, contact members 8 of relay 9 conductor 45 and conductor X to the power source. When relay 9 is energized it also closes contact members 10 to provide a holding circuit for relay 9 by substituting conductor 46 for conductor 41 in the energizing circuit for relay 9.

The circuit conditions which obtain just as the circuit breaker is moved to closed position are shown in Fig. 4. It will be seen that the closure of the circuit breaker opens contact members 6 to deenergize relay 23. Relay 23, immediately after the conditions shown in Fig. 4, will open contact members 22 to deenergize coil 20 of relay 12. It will be seen from Fig. 4 that the closure of circuit breaker 3 closes a pair of contact members 7 to short circuit the operating coil of relay 14 through a circuit which includes contact members 7, conductor 47, conductor 36, conductor 40, the coil of relay 14 and conductor 35. Immediately after the conditions shown in Fig. 4 are brought about, relay 14 will be deenergized by this shunt circuit and will open its holding circuit at contact members 13 and the bridge circuit at contact members 18.

The deenergization of the closing coil for circuit breaker 3 will be effected by the opening of contact members 8 when relay 9 is deenergized by the opening of contact members 13. At this stage of the operation of the device, the elements of the relay system will have returned to their normal positions, as shown in Fig. 1, and generator 1 will be feeding power to the load circuit through conductor X, conductor Y and closed circuit breaker 3.

In the event that overload or other abnormal conditions cause the circuit breaker 3 to open after it has been closed, the relay system will again be placed in operation to condition the circuit of the closing means of the circuit breaker 3 for operation in response to the polarity and potential of the generator 1 and to complete the circuit of the closing means for circuit breaker 3 in response to a predetermined load condition on the load circuit as described above.

It may be desirable, in some installations, to provide a separate polarity determining relay to operate switch 29 in response to the desired polarity of the generator or other direct current source so as to cause energization of the relay system only after the polarity of the direct current source has been determined to be proper. This may be done by adding the polarized relay 56, having its actuating winding so connected across the source of direct current 1 as to move the contact element 29 to closed circuit position only when the desired polarity exists on the direct current source. It will be seen that the movement of contact element 29 to closed circuit position causes the relay system to be energized through the conductor C.

Thus it will be seen that we have provided a relay system for connecting a generator or a converter or other source of direct-current power to a load circuit in which a single directional relay is utilized in checking the voltage and polarity of the generator and the effective load resistance of the load circuit.

In compliance with the requirements of the patent statutes, we have shown and described herein a preferred embodiment of our invention It is understood, however, that the invention is not limited to the precise construction shown and described, but is capable of modification by one skilled in the art, the embodiments herein shown being merely illustrative of the principles of our invention.

We claim as our invention:

1. In a control relay system for closing a circuit breaker to connect a direct-current source to a feeder of a direct-current distribution system, a control relay for the closing coil of a circuit breaker, a circuit for said control relay having two normally open switches in series therein, a directional relay, means for so energizing said directional relay as to compare the polarity and voltage of the source and the feeder, means whereby said directional relay closes one of said switches when the polarity of the source and the feeder are the same and the generator voltage is a predetermined amount above the feeder voltage, means under control of said last-mentioned means for closing said one switch for so connecting said directional relay in a bridge arrangement the load in the feeder circuit constituting one arm of the bridge as to render the directional relay responsive to the equivalent load resistance of the feeder system, and means whereby said directional relay closes the second of said normally open switches when the feeder load, as measured by its equivalent resistance, does not exceed the value of the load which it is desired to have the source carry.

2. In a protective relay system for closing a circuit breaker to connect a direct-current source to a feeder of a direct-current distribution system, a resistance connected across the main contact members of the breaker from one side of the source to the feeder, a directional relay having a current coil and a voltage coil, said current coil being connected across said resistance so as to be affected by any current flow between the source and the feeder, said voltage coil being connected across a source of direct current of fixed polarity, said relay having a first contacting means which is closed by the relay when the voltage of the generator is a predetermined amount higher than the voltage of the feeder and the generator and feeder polarities are the same, a resistance bridge arrangement for measuring the equivalent load resistance of the feeder the load in the feeder circuit constituting one arm of the bridge arrangement, means governed by the response of the directional relay to voltage and polarity for connecting said current coil to be energized by the resistance bridge to a degree depending upon the unbalance of the resistance bridge, said directional relay having a second contacting means which is closed when the feeder load, as measured by its equivalent resistance, is below the maximum load it is desired to place upon the source, and means whereby the closing coil of said circuit breaker is energized in response to the closing of said first and second contacting means of the directional relay.

3. In a protective relay system for connecting a direct-current source to a feeder of a direct-current distribution system, a circuit breaker having its main contact members connected to one side of the source of a feeder, respectively, a resistance, a first relay for connecting said resistance across said circuit breaker when the circuit breaker is open and substantial voltage exists on the source, a closing coil for the circuit breaker, a second relay having contact means for closing the closing coil circuit and contact means for controlling a holding circuit for itself, a third relay having contact means in series with said second relay coil, a directional relay having a voltage coil connected across a direct current source of fixed polarity and a current coil connected across said resistance and having contact means in circuit to energize said relay coil when the source polarity is the same as that of the feeder and the source voltage is a predetermined amount above the feeder, said second relay having contact means in circuit to hold it energized, a Wheatstone bridge arrangement including said resistance in one leg, the feeder across another leg and a variable resistance across a third leg, contact means operated by said third relay for connecting said bridge in circuit with said current coil so that said current coil may be affected by the unbalance of said bridge, said directional relay having other contact means for completing the circuit to said second relay when actuated by said bridge circuit over-balance, said bridge being so adjusted as to cause said directional relay to close said other contact means when the load on the feeder, as measured by the bridge, which would be carried by the source if connected to the feeder, is less than the maximum load which it is desired to place on the source, and contact means operated by said circuit breaker for de-energizing said relays when the circuit breaker is closed.

4. In a relay system for controlling a circuit breaker for connecting a source of direct-current power to a feeder of a direct-current distribution system, a resistance connected across the main contact members of the feeder, a directional relay having a current coil and a voltage coil, said current coil being connected across said resistance so as to be affected by any current flow between the direct-current source and the feeder, said voltage coil being connected across a direct-current source of fixed polarity, said relay having a first contacting means which is closed by the relay when the voltage of the direct current source is a predetermined amount higher than the voltage of the feeder and the polarities of the feeder and direct-current source are the same, a Wheatstone bridge arrangement including said resistance in one leg, the feeder across another leg and a variable resistance across a third leg, for measuring the equivalent load resistance of the feeder, means governed by the response of the directional relay to voltage and polarity for connecting said current coil to be energized by the bridge to a degree depending upon the degree of unbalance of the bridge, said relay having a second contacting means which is closed when the feeder load, as measured by its equivalent resistance in the bridge circuit, is less than the maximum load which it is desired to have the source of direct current carry, this desired maximum load condition being variable by means of the said variable resistance, and means whereby the closing coil of the circuit breaker is energized in response to the closing of said first and second contacting means of the directional relay.

5. In a relay system for controlling a circuit breaker for connecting a source of direct current power to a load circuit, a circuit breaker, a circuit breaker closing means, a first circuit for conditioning said circuit breaker closing means for operation, a second circuit for causing said circuit breaker closing means to operate, a directional relay, means whereby said directional relay selectively controls said first and second circuits, means whereby said directional relay will close said first circuit when the polarity of the source of current is the same as that of the load circuit and the voltage of the source is a predetermined amount above the load circuit voltage, and means including said first circuit whereby said directional relay will close said second circuit when no more than that part of the load on the load circuit which it is desired to have the source carry exists.

WILLIAM R. TALIAFERRO.
ROBERT R. LONGWELL.